United States Patent
Walters (10) Patent No.: US 8,754,625 B2
(45) Date of Patent: Jun. 17, 2014

(54) SYSTEM AND METHOD FOR CONVERTING AN AC INPUT VOLTAGE TO REGULATED OUTPUT CURRENT

(75) Inventor: Michael M. Walters, Apex, NC (US)

(73) Assignee: Intersil Americas Inc., Milpitas, CA (US)

( * ) Notice: Subject to any disclaimer, the term of this patent is extended or adjusted under 35 U.S.C. 154(b) by 554 days.

(21) Appl. No.: 13/162,410

(22) Filed: Jun. 16, 2011

(65) Prior Publication Data

US 2012/0081081 A1    Apr. 5, 2012

Related U.S. Application Data (60) Provisional application No. 61/388,353, filed on Sep. 30, 2010.

(51) Int. Cl.
  *G05F 1/56* (2006.01)
  *H03K 3/00* (2006.01)

(52) U.S. Cl.
  USPC ............................. 323/285; 327/303

(58) Field of Classification Search
  USPC ............... 323/265, 282–286, 222; 327/303; 363/125
  See application file for complete search history.

(56) References Cited

U.S. PATENT DOCUMENTS

| | | | |
|---|---|---|---|
| 5,642,267 A | 6/1997 | Brkovic et al. | |
| 6,400,127 B1 * | 6/2002 | Giannopoulos | 323/283 |
| 6,737,845 B2 * | 5/2004 | Hwang | 323/284 |
| 7,538,532 B2 * | 5/2009 | Hack et al. | 323/284 |
| 7,615,981 B2 * | 11/2009 | Wong et al. | 323/285 |
| 7,902,803 B2 * | 3/2011 | Peng et al. | 323/283 |
| 8,054,058 B2 * | 11/2011 | Liu et al. | 323/284 |
| 8,222,883 B2 * | 7/2012 | Kraft | 323/299 |
| 8,319,486 B2 * | 11/2012 | Maksimovic et al. | 323/283 |
| 8,598,933 B2 * | 12/2013 | Ziegler et al. | 327/303 |
| 2005/0194942 A1 * | 9/2005 | Hack et al. | 323/205 |
| 2008/0224636 A1 | 9/2008 | Melanson | |
| 2010/0128503 A1 | 5/2010 | Liu et al. | |
| 2010/0194353 A1 * | 8/2010 | Chen | 320/162 |

FOREIGN PATENT DOCUMENTS

CN    101382815 A    3/2009

OTHER PUBLICATIONS

Sabzali, Ahmad J. et al. "A New Bridgeless PFC Sepic and Cuk Rectifiers with Low Conduction and Switching Losses." Department of Electrical Engineering, College of Technological Studies, P.O. Box 35007, Al-Shaa'b, Kuwait, 36051 PEDS2009. pp. 550-556.

Xie, Yeyuan et al. "A Novel Buck-Boost Z-Source Rectifier." Zhejiang University, Hangzhou, China, 310027 pp. 1-5.

(Continued)

*Primary Examiner* — Adolf Berhane
(74) *Attorney, Agent, or Firm* — Gary Stanford (57) ABSTRACT

A converter according to one embodiment converts an AC voltage to a regulated output current provided to a DC load of a Z-type configuration. A filter capacitor is provided to average current flowing through the load. The converter includes a rectifier network for rectifying the AC voltage and for providing a rectified voltage, and a smoothing capacitor for smoothing the rectified voltage. The converter includes a hysteretic current mode controller which controls a switching transistor based on sensed voltage and sensed current provided through an inductor coupled in series with the load. The transistor is turned on when current reaches a low valley level and is turned off when the current reaches a peak level. Operation toggles in this manner while a sensed voltage is above a predetermined level. A valley fill network may be provided to keep sensed voltage from falling below the predetermined minimum level.

20 Claims, 6 Drawing Sheets

(56) References Cited

OTHER PUBLICATIONS

Zhou, Dongyan. "Synthesis of PWM Dc-to-Dc Power Converters." Thesis. California Institute of Technology, Pasadena, California. 1996, pp. 1-199.

Cao, Dong et al. "A Family of Z-source and Quasi-Z-source DC-DC Converters." The Department of ECE at Michigan State University, 2120 Engineering Building, East Lansing, MI 48824 USA, 2009 IEEE pp. 1097-1101.

* cited by examiner

SYSTEM AND METHOD FOR CONVERTING AN AC INPUT VOLTAGE TO REGULATED OUTPUT CURRENT

CROSS-REFERENCE TO RELATED APPLICATIONS

This application claims the benefit of U.S. Provisional Application Ser. No. 61/388,353, filed on Sep. 30, 2010, which is hereby incorporated by reference in its entirety for all intents and purposes.

BRIEF DESCRIPTION OF THE DRAWINGS

The benefits, features, and advantages of the present invention will become better understood with regard to the following description, and accompanying drawings in which.

DETAILED DESCRIPTION

The benefits, features, and advantages of the present invention will become better understood with regard to the following description, and accompanying drawings The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

A converter (also referred to herein as a regulator) according to one embodiment of the present invention is a simple, low-cost converter which converts an AC input into a regulated output current. A converter as described herein may be used to drive a variety of loads in which a DC current is desired. A non-limiting list of examples includes a battery charger, a light-emitting diode (LED) driver, a driver for a coil of an electric motor, one or more laser diodes, etc. A converter according to one embodiment may use standard inductors and avoids a custom transformer. A custom transformer is otherwise common for use in a conventional LED drivers. In one embodiment, the converter does not need a snubber circuit to control overshoot on a power switching device or electronic switching device. Examples of power switching devices or electronic switches include a metal-oxide semiconductor, field-effect transistor (MOSFET) or other similar forms (e.g., FETs, MOS devices, etc.), bipolar junction transistor (BJTs) and the like, insulated-gate bipolar transistors (IGBTs) and the like, etc. Smaller and less expensive capacitors may be used for switching frequency filtering so that electrolytic capacitors, which are generally characterized by short life, high cost, and large size, may thus be avoided. A simple hysteretic current controller provides accurate current regulation and reduced electromagnetic interference (EMI) emissions. A system and method according to an embodiment of the present invention uses a reduced number of components thereby reducing size and cost.

Figure 1:
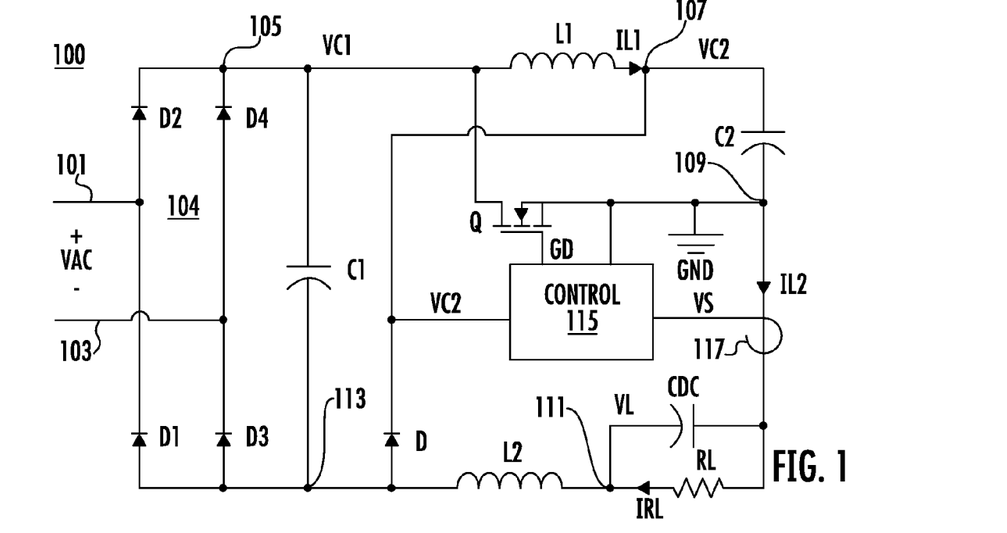
FIG. 1 is a simplified schematic and block diagram of a converter implemented according to one embodiment.

FIG. 1 is a simplified schematic and block diagram of a converter 100 implemented according to one embodiment. The converter 100 is configured using a quasi-Z-source configuration and operates to convert an alternating current (AC) input voltage VAC to an output voltage VL applied across a load resistor RL relative to a reference supply voltage, such as ground (GND). VAC has a positive polarity applied on a node 101 and a negative polarity on a node 103. VAC is applied to a bridge rectifier 104 including diodes D1, D2, D3 and D4. The cathode of D1 and the anode of D2 are coupled to node 101, and the cathode of D3 and the anode of D4 are coupled to node 103. The cathodes of D2 and D4 are coupled to a node 105 developing a voltage VC1. Node 105 is coupled to one end (e.g., positive terminal) of a filter capacitor C1, to one end of an inductor L1, and to the drain of an electronic switch Q. The electronic switch Q is implemented as an N-channel MOSFET, although alternative power switching devices are contemplated.

The other end of L1 is coupled to a node 107 developing a voltage VC2, in which node 107 is further coupled to one end (e.g., positive terminal) of another filter capacitor C2, to the cathode of a diode D, and to an input of a controller 115. The source of Q, the other end of C2 (e.g., negative terminal) and another input of the controller 115 are coupled to a node 109, which is further coupled to GND. The load resistor RL is coupled between node 109 and another node 111, and a filter capacitor CDC is coupled in parallel with RL. Node 111 develops the output voltage VL (relative to GND), and is coupled to one end of another inductor L2. The other end of L2 is coupled to a node 113, which is further coupled to the cathodes of diodes D, D1 and D3, and to the other end (e.g., negative terminal) of the capacitor C1. A current IL1 flows from node 105 to node 107 via the inductor L1. A current IL2 flows from node 109 through the load (CDC and RL) and through the inductor L2 into node 113, and thus represents the current flowing through the inductor L2. A current sensor 117 senses IL2 and develops a proportional voltage sense signal VS, which is provided to another input of the controller 115. The controller 115 asserts a gate drive signal GD to the gate of Q. A load current IRL flows through RL.

The bridge rectifier 104 converts the AC input voltage VAC to a rectified DC voltage VC1 across capacitor C1, and to another voltage VC2 across capacitor C2. The configuration of the inductors (L1 & L2), the capacitors (C1 & C2), the switch Q, and the diode D collectively form a quasi-Z-source regulator. In operation, the controller 115 monitors the voltage VC2 of the capacitor C2 and the current IL2 of the inductor L2 and regulates the load by modulating activation of Q, e.g., by turning Q on and off via the GD signal.

Figure 2:
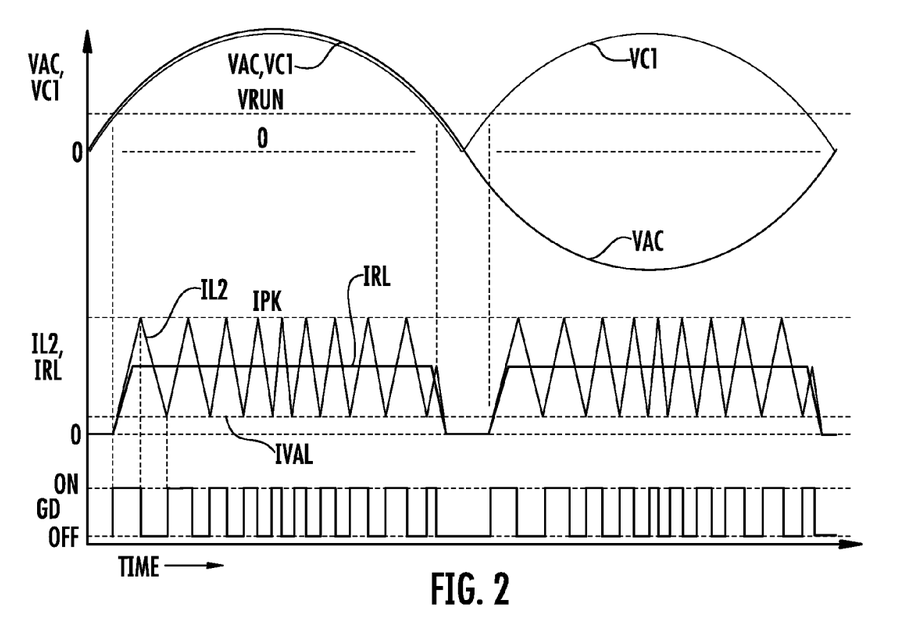
FIG. 2 is a series of timing diagrams which illustrate operation of the converter of FIG. 1.

FIG. 2 is a series of timing diagrams which illustrate operation of the converter 100, in which VAC, VC1, IL2, IRL and GD are plotted versus time. VAC is generally a sinusoidal signal which oscillates between positive and negative peaks centered at 0 Volts (V) or GND. VC1 is a rectified version of VAC, so that the magnitude of VC1 follows VAC except remains positive while VAC goes negative during the second half of each cycle. The capacitors C1 and C2 smooth the switching frequency rather than storing VAC frequency energy or holding up a rectified input voltage VC1. The capacitance used for switching frequency filtering is smaller than the capacitance used for line frequency energy storage. Electrolytic capacitors, which are generally characterized as short life, high cost, and large size, may thus be avoided for the converter 100.

When VC1 is below a positive voltage threshold shown as VRUN, GD is held low so that Q is turned off. Once VC1 exceeds VRUN, the controller 115 asserts GD high so that Q is turned on and the current IL2 through L2 increases at a rate proportional to VC1 plus the load voltage VL. It is noted that VL is negative with respect to GND. When IL2 reaches a peak threshold current, shown as IPK, the controller 115 asserts GD low to turn Q off. The diode D conducts to provide a path for IL2, and IL2 decreases at a rate proportional to VC2 plus VL. When IL2 reaches a valley threshold current, shown as IVAL, the controller 115 asserts GD high again to turn Q back on. The switching cycle repeats so that IL2 transitions between IVAL and IPK while VC1 is above VRUN. It is noted that the slope of the transitions of IL2 change (increase/decrease) as VC1 changes (increases/decreases). When VC1 decreases below VRUN, the controller 115 pulls GD low to keep Q turned off. This control method may be referred to as hysteretic current mode or bang-bang control. The capacitor CDC filters the switching frequency ripple so that the load current IRL through the load RL is generally the average of IPK and IVAL while VC1 is above VRUN.

Although not explicitly shown, the current wave shape of the current IL1 in the inductor L1 is similar to that of IL2. When Q is turned on, IL1 increases at a rate proportional to the level of VC2 (e.g., the rate of change or derivative of IL1 is related to or otherwise approximately equal to VC2/L1), and when Q is turned off, diode D provides a path for IL1 to decrease proportional to VC1.

Figure 3:
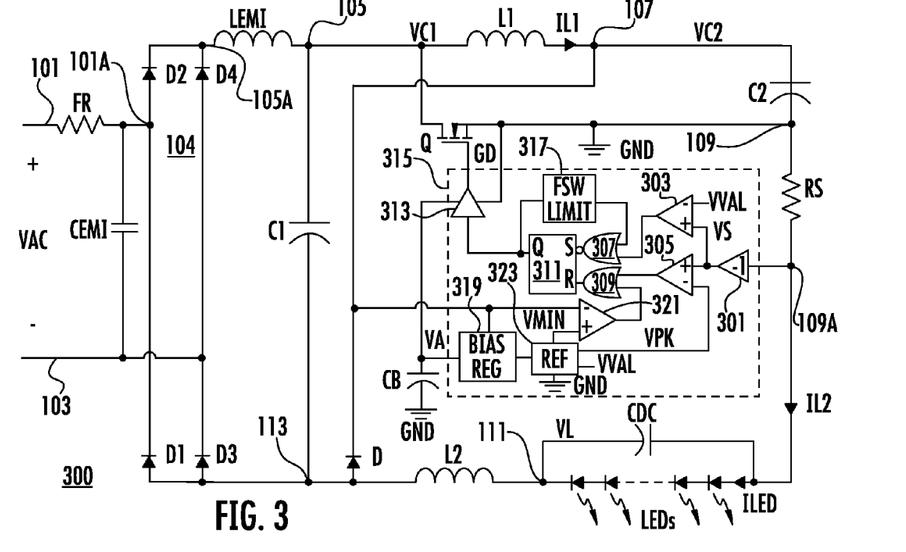
FIG. 3 is a schematic and block diagram of a converter, which is a more specific embodiment of the converter of FIG. 1 in which similar components assume identical reference designators.

FIG. 3 is a schematic and block diagram of a converter 300, which is a more specific embodiment of the converter 100 of FIG. 1 in which similar components assume identical reference designators. VAC is again provided across nodes 101 and 103, in which a fusible resistor FR is provided between node 101 and a node 101A for safety purposes. An EMI filter capacitor CEMI is coupled between nodes 101A and 103, and the anodes of the diodes D1 and D2 are instead coupled to node 101A. The cathodes of diodes D2 and D4 are instead coupled to a node 105A, and a filter inductor LEMI is coupled between nodes 105 and 105A. LEMI, CEMI and C1 collectively operate as an EMI filter to reduce emissions. Devices C1, C2, L1, L2, D and Q are coupled to nodes 105, 107, 109, 111 and 113 in a similar manner as the converter 100. The current sensor 117 is replaced by a sense resistor RS coupled between node 109 (GND) and a node 109A. RS is typically a relatively small-valued resistance so that nodes 109 and 109A have substantially the same voltage levels for purposes of the load. The load filter capacitor CDC is coupled between nodes 111 and 109A. The load resistor RL is replaced with a series string of LEDs coupled between nodes 111 and 109A. The load current through the LEDs is shown as a current ILED. The cathodes of D1 and D3 are coupled to node 113 in similar manner.

The controller 115 is replaced by a controller 315. In the illustrated embodiment, the controller 315 includes an inverting buffer 301, comparators 303, 305 and 321, logic gates 307 and 309, a set-reset (SR) latch 311, gate drive amplifier 313, a frequency switching (FSW) limiter 317, a bias regulator 319, and a reference generator 323. The input of the buffer 301 is coupled to node 109A and its output is coupled to the non-inverting inputs of both comparators 303 and 305. The output of the comparator 303 is coupled to one input of the logic gate 307, which is configured as a 2-input NOR gate. The output of the comparator 305 is coupled to one input of the logic gate 309, which is configured as a 2-input OR gate. The output of NOR gate 307 is coupled to the set input of the SR latch 311 and the output of OR gate 309 is coupled to the reset input of the SR latch 311. The Q output of the SR latch 311 is coupled to the input of the amplifier 313 and to an input of the FSW limiter 317. The output of the amplifier 313 develops the GD signal provided to the gate of Q. The output of the FSW limiter 317 is provided to the other input of the NOR gate 307.

Node 107 developing VC2 is provided to an input of the bias regulator 319 and to the inverting input of the comparator 321. The bias regulator 319 develops a voltage VA filtered by a capacitor CB (relative to GND) to a source voltage input of the amplifier 313 also referenced to GND (or has its other supply voltage input coupled to GND). The bias regulator 319 also develops a source voltage provided to the reference generator 323, which develops reference voltage levels VMIN, VVAL and VPK. VMIN is provided to the non-inverting input of the comparator 321, VPK is provided to the inverting input of the comparator 305, and VVAL is provided to the inverting input of the comparator 303.

The current IL2 through RS develops a relatively small negative voltage level on node 109A, which is inverted and buffered (and amplified, if desired) by the buffer 301 to provided a proportional sense voltage VS to the comparators 303 and 305. VVAL corresponds with IVAL, VPK corresponds with IPK, and VMIN corresponds with VRUN. In one embodiment, the FSW limiter 317 operates to limit switching frequency of Q to a predetermined maximum level. In one embodiment, the FSW limiter 317 is a falling edge delay. When the SR latch 311 is set, its Q output is high and the output of the FSW limiter 317 is also high. When the SR latch 311 is reset and its Q output is low, the falling edge delay output of the FSW limiter 317 stays for a predetermined time to prevent the SR latch 311 from being set. In one embodiment, the predetermined time is approximately 1 microsecond (μs). In this manner, the switching limit function limits switching frequency to a maximum of about 1 megaHertz (MHz) which may vary down to about 500 kiloHertz (kHz) with a 50% duty cycle. In this case, the switching limit function operates as a minimum off time function and is not necessarily a precise frequency limit.

Operation of the converter 100 is substantially similar to that of the converter 100 as illustrated by the timing diagrams of FIG. 2. The current IRL is replaced by the LED current ILED through the LEDs. VAC and VC1 operate in substantially the same manner. When VC1 is below VRUN, VC2 is below VMIN, the output of the comparator 321 is high, and the output of the OR gate 309 is high which keeps the SR latch 311 in a reset state to prevent GD from going high. When VC1 rises above VRUN and VC2 exceeds VMIN, the output of the comparator 321 goes low releasing the SR latch 311 from the held reset state. Since VS is below VVAL indicating that the current IL2 is below IVAL, the output of the comparator 303 is low. Assuming the output of the FSW limiter 317 is also low, the output of the NOR gate 307 goes high to set the SR latch 311 to pull GD high to turn on switch Q. The current IL2 increases at a linear rate (as previously described) until VS rises to VPK indicating that IL2 reaches IPK, at which time the output of the comparator 305 goes high to pull the output of the OR gate 309 high to reset the SR latch 309. The SR latch 309 pulls GD low to turn off Q, and IL2 decreases at a linear rate back down to IVAL. Operation repeats in this manner as illustrated in FIG. 2.

The average LED current ILED is set by the peak and valley thresholds, IPK and IVAL as determined by VPK and VVAL, respectively. The controller 315 enables simplified biasing, gate drive and current sensing. A simple bias regulator 319 derives control and gate drive power from VC2. The source of Q is also coupled to ground, enabling a single-ended gate driver. The current IL2 produces a negative voltage across RS (with respect to ground) and numerous methods (including an inverting voltage amplifier or a voltage-to-current amplifier) may provide the control with a suitable signal (e.g., VS) proportional to IL2.

Figure 4:
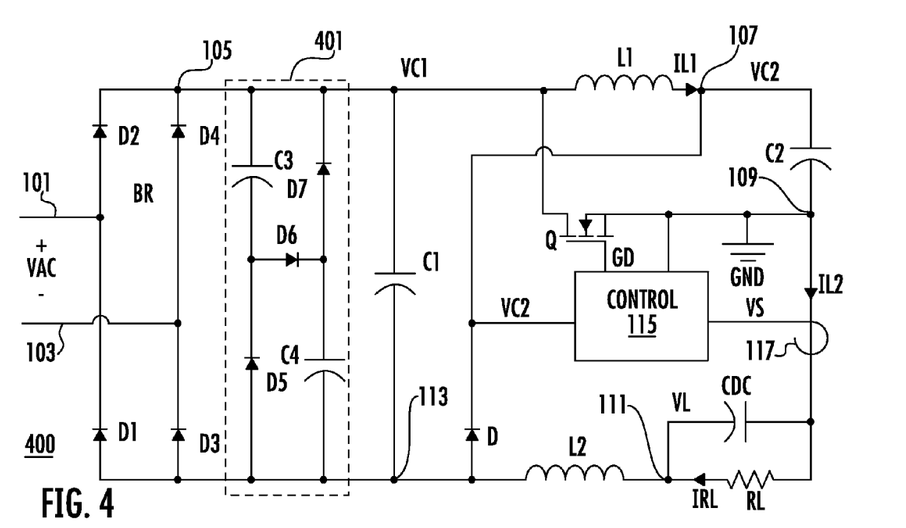
FIG. 4 is a schematic and block diagram of a converter, which is configured in substantially the same manner as the converter of FIG. 1 in which similar components assume identical reference designators.

FIG. 4 is a schematic and block diagram of a converter 400, which is configured in substantially the same manner as the converter 100 in which similar components assume identical reference designators. The converter 400 further includes an exemplary valley fill network 401, which includes additional diodes D5, D6 and D7 and capacitors C3 and C4. The anode of D5 is coupled to node 113, and its cathode is coupled to the anode of D6 and to one end of C3. The other end of C3 is coupled to node 105. One end of C4 is coupled to node 113, and its other end is coupled to the cathode of D6 and the anode of D7. The cathode of D7 is coupled to node 105.

The valley fill network 401 is added to the rectified quasi-Z-source converter configuration to provide a continuous load power at the output. The valley fill network 401 provides energy storage by holding up VC1 near the zero crossing of VAC. The capacitors D3 and C4 within the valley fill network 401 charge in series near the peak voltage of VAC and discharge in parallel to fill in the valley of the rectified voltage VC1. The valley fill network 401 provides the energy during the zero crossing for applications that require continuous load regulation. The hysteretic current control provides a simple means to regulate load current. As previously stated, the load current is the mean between the IPK and IVAL thresholds. Another advantage of the hysteretic current mode control is the reduced EMI due to the variation of the switching frequency over the period of VAC. The switching frequency is a function of the inductance L2 and the voltages VC1, VC2, and VL.

Figure 5:
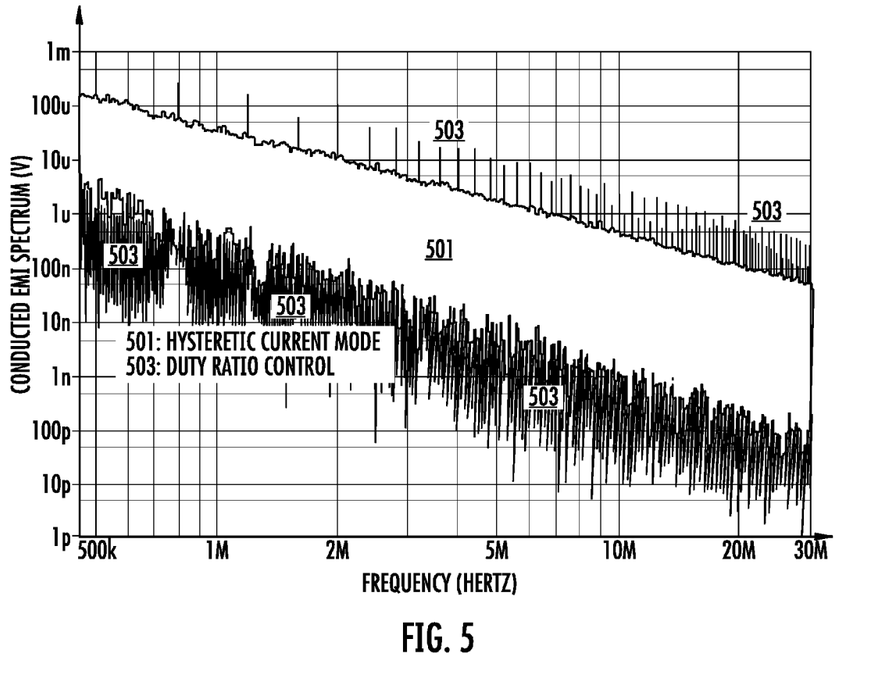
FIG. 5 shows the measurements of the conducted EMI spectrum for both a hysteretic current control simulation circuit and a duty ratio control simulation circuit.

FIG. 5 shows the measurements of the conducted EMI spectrum for both a hysteretic current control simulation circuit (not shown) and a duty ratio control simulation circuit (not shown), each with substantially identical power components. The spectrum is measured in Volts versus frequency in Hertz ("k" denoting kilohertz and "M" denoting MegaHertz). A first spectrum 501 is the conducted EMI for the hysteretic current control circuit, and a second spectrum 503 is the conducted EMI for the duty ratio control circuit. The characteristic peaks of the second spectrum 503 for the fixed switching frequency duty ratio control circuit are significantly larger than characteristic peaks of the first spectrum 501 for the hysteretic current control circuit.

Figure 6:
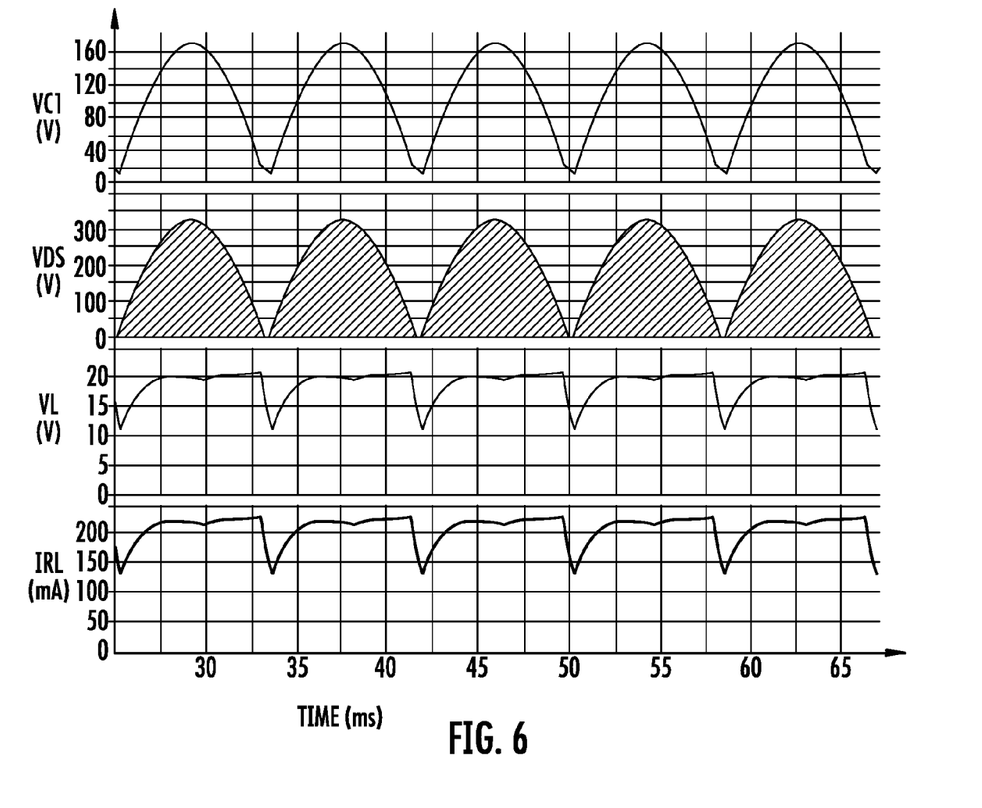
FIG. 6 is a timing diagram illustrating simulation results for a converter configured substantially similar to the converter of FIG. 3, except replacing the LEDs with a static resistor.

FIG. 6 is a timing diagram illustrating simulation results for a converter configured substantially similar to the converter 300, except replacing the LEDs with a static 90Ω resistor. Voltages VC1, VDS, VL and a load current IRL are shown plotted versus time (in milliseconds or ms). VDS is the drain-to-source voltage of the switch Q. IRL is the load current (in milli-Amps or mA) through the static 90Ω resistor. The simulation results correlated well with corresponding breadboard results (not shown).

Figure 7:
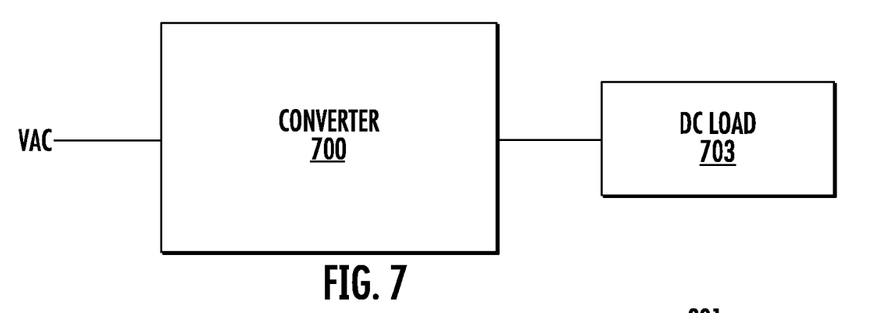
FIGS. 7-10 illustrate various electronic devices using a converter implemented according to any of the configurations described herein.
Figure 8:
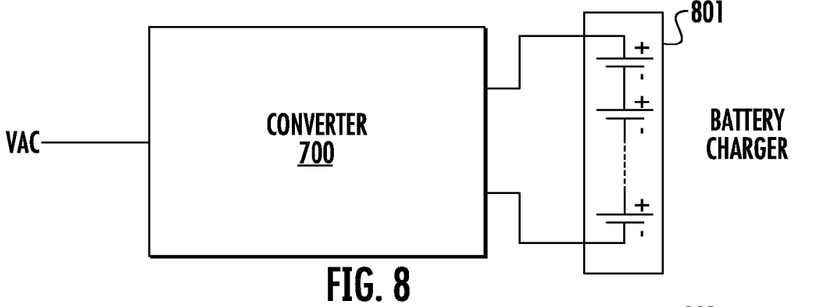
Figure 9:
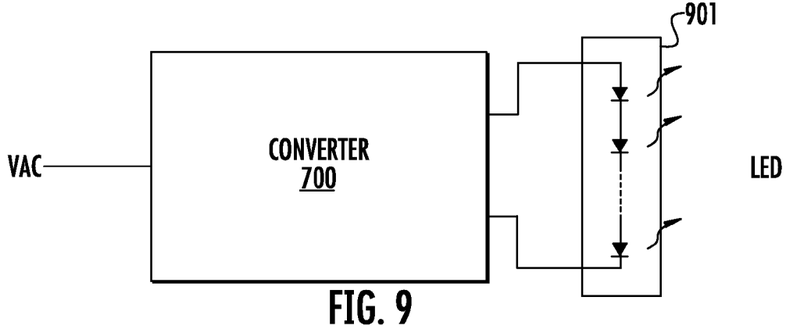
Figure 10:
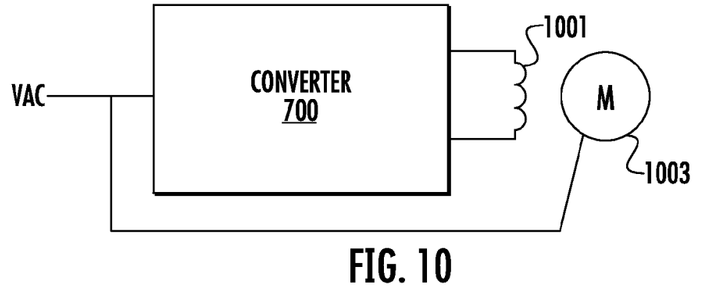

FIGS. 7-10 illustrate various electronic devices using a converter 700 implemented according to any of the configurations described herein. The converter 700 may be implemented as a quasi-Z-source converter as described herein. As shown in FIG. 7, the converter 700 receives VAC and drives any type of DC load 703. As shown in FIG. 8, the converter 700 receives VAC and charges a battery or battery bank 801 including one or more rechargeable batteries. As shown in FIG. 9, the converter 700 receives VAC and provides current to one or more light-emitting diodes (LEDs) 901. As shown in FIG. 10, the converter 700 receives VAC and provides current to a coil 1001 or the like to generate a magnetic field for an electric motor 1003 or the like.

Figure 11:
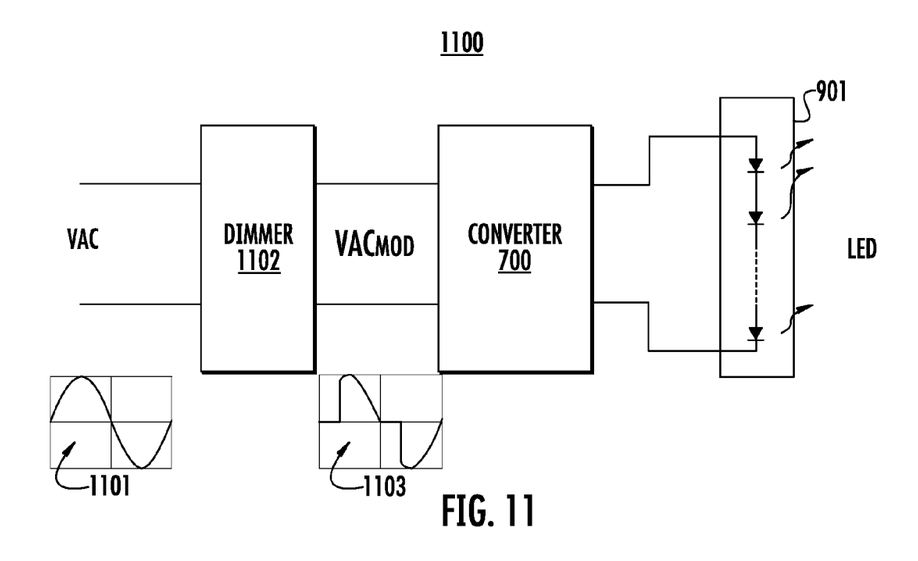
FIG. 11 is a block diagram of an electronic device including a converter configured in a similar manner as that shown in FIG. 9 for providing current to one or more LEDs.

FIG. 11 is a block diagram of an electronic device 1100 including the converter 700 configured in a similar manner as that shown in FIG. 9 for providing current to one or more LEDs 901. In this case, a conventional line dimmer 1102 receives VAC (e.g., AC line voltage) and provides an AC conductive angle modulated voltage or "chopped" voltage $VAC_{MOD}$, which is provided to the input of the converter 700. In one embodiment, the line dimmer circuit 1102 operates to selectively chop one or both of the leading edge and the trailing edge of VAC, depicted at 1101, at any phase angle between 0 and 180 degrees for every half cycle (i.e., 180 degrees), to provide $VAC_{MOD}$. An exemplary form of $VAC_{MOD}$ is depicted at 1103 in which the leading edge is chopped during every half cycle. In one embodiment, the line dimmer circuit 1102 uses a TRIAC (not shown) or the like to delay the VAC wave shape near zero until the predetermined phase angle. The greater the dimmer phase angle, the more VAC is chopped or zeroed to reduce the voltage of $VAC_{MOD}$. Once the phase angle is reached per half cycle, VAC steps up to the line voltage (e.g., the TRIAC conducts) and the remaining portion of VAC is output to the converter 700.

The converter 700 provides an advantage for dimming operation as compared to a conventional line dimmer circuit. The LEDs 901 turn off twice per cycle of VAC near the zero crossing. The converter 700 regulates the LED current. In this case, the average LED current and the corresponding amount of light output are proportional to the dimmer phase angle. Conventional LED dimmers use complex control to derive the dimming phase angle and then regulate the average LED current in proportion to the phase angle. The converter 700 does not use complex control and automatically regulates the average LED current in proportion of the phase angle.

A converter according to one embodiment converts an AC voltage to a regulated output current provided to a load. The converter includes first through fifth nodes and a reference node coupled to the first node. The load is for coupling between the first and second nodes in parallel with a filter capacitor. The converter further includes a rectifier network for rectifying the AC voltage and for providing a rectified voltage on a third node, a second capacitor coupled between the third and fourth nodes, a first inductor coupled between the third and fifth nodes, a third capacitor coupled between the fifth node and the reference node, a second inductor coupled between the second and fourth nodes, and a first diode having an anode coupled to the fourth node and a cathode coupled to the fifth node. The converter further includes a current sensing device for sensing current which flows from the reference node to the fourth node through the second inductor and for providing a sense signal indicative thereof. The converter further includes a switching transistor having a first current terminal coupled to the third node, a second current terminal coupled to the reference node, and having a control terminal. The converter includes a hysteretic current mode controller which is coupled to the third node and to the control terminal of the switching transistor and which receives the sense signal. The converter controls the switching transistor based on the sense signal to regulate the current through the second inductor.

An electronic device according to one embodiment includes a Z-type converter, a current sensor, a DC load, and a controller. The Z-type converter includes a bridge rectifier, first and second capacitors, first and second inductors, a first inductor and an electronic switch. The rectifier rectifies an AC voltage to provide a rectified voltage on a first node. The first capacitor is coupled between the first node and a second node. The first inductor is coupled between the first node and a third node. The second capacitor is coupled between the third node and a fourth node having a reference voltage level. The second inductor is coupled between the second node and a fifth node. The first diode has an anode coupled to the second node and a cathode coupled to the third node. The electronic switch has a first current terminal coupled to the first node, a second current terminal coupled to the fourth node, and has a control terminal. The current sensor senses current from the fourth node to the fifth node and through the second inductor and provides a proportional sense signal. The DC load includes a filter capacitor and is coupled between the fourth and fifth nodes. The controller is coupled to the third node, receives the sense signal, and is coupled to the control terminal of the electronic switch. The controller controls the electronic switch to maintain relatively constant current through the second inductor.

A method of converting an AC input voltage to a DC output with a regulated output current using a converter is disclosed. The converter includes a first inductor coupled between first and second nodes, a first capacitor coupled between the second node and a reference node, a diode having an anode coupled to a third node and a cathode coupled to the second node, a load network including a filter capacitor coupled between the reference node and a fourth node, a second inductor coupled between the third and fourth nodes, and a switch having current terminals coupled between the first and reference nodes and having a control terminal. The method includes rectifying the AC input voltage to provide a rectified voltage between the first and third nodes, monitoring voltage of the second node, monitoring second inductor current flowing through the second inductor and providing a sense signal indicative thereof, turning on the switch when the sense signal indicates that the second inductor current falls to a valley current level while the voltage of the second node is at least a predetermined minimum level, and turning off the switch when the voltage of the second node is less than the predetermined minimum level and when the sense signal indicates that the second inductor current rises to a peak current level while the voltage of the second node is at least the predetermined minimum level.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. A converter for converting an AC voltage to a regulated output current provided to a load, comprising:
   a first node for coupling to a first end of the load and a second node for coupling to a second end of the load;
   a filter capacitor coupled between said first and second nodes;
   a rectifier network for receiving the AC voltage and for providing a rectified voltage on a third node;
   a second capacitor coupled between said third node and a fourth node;
   a first inductor coupled between said third node and a fifth node;
   a third capacitor coupled between said fifth node and a reference node, wherein said reference node is coupled to said first node;
   a second inductor coupled between said second and fourth nodes;
   a first diode having an anode coupled to said fourth node and a cathode coupled to said fifth node;
   a current sensing device for sensing current which flows from said reference node to said fourth node through said second inductor and for providing a sense signal indicative thereof;
   a switching transistor having a first current terminal coupled to said third node, a second current terminal coupled to said reference node, and having a control terminal; and
   a hysteretic current mode controller which is coupled to said third node and to said control terminal of said switching transistor, which receives said sense signal, and which controls said switching transistor based on said sense signal to regulate said current through said second inductor.

2. The converter of claim 1, wherein said filter, second and third capacitors are non-electrolytic capacitors.

3. The converter of claim 1, wherein said hysteretic current mode controller turns on said switching transistor when said sense signal indicates a valley current level, wherein said hysteretic current mode controller turns off said switching transistor when said sense signal indicates a peak current level which is greater than said valley current level, and wherein said filter capacitor is configured to filter switching frequency ripple so that current through the load is an the average of said valley current level and said peak current level.

4. The converter of claim 3, wherein said hysteretic current mode controller comprises:
   a first comparator which compares said sense signal with a valley value indicative of said valley current level and which provides a set signal indicative thereof;
   a second comparator which compares said sense signal with a peak value indicative of said peak current level and which provides a reset signal indicative thereof; and
   a logic network coupled to said control terminal of said switching transistor and receiving said set and reset signals, wherein said logic network turns on said switching transistor in response to said set signal and turns off said switching transistor in response to said reset signal.

5. The converter of claim 4, further comprising:
   a third comparator which compares voltage level of said fifth node with a predetermined minimum level and which provides an enable signal; and
   wherein said logic network keeps said switching transistor turned off while said enable signal indicates that said voltage level of said fifth node is below said predetermined minimum level.

6. The converter of claim 1, further comprising a valley fill network coupled between said third and fourth nodes to keep said fifth node above a predetermined minimum level.

7. The converter of claim 6, wherein said valley fill network comprises:
- a second diode having an anode coupled to said fourth node and an anode coupled to a sixth node;
- a third diode having an anode coupled to said sixth node and an anode coupled to a seventh node;
- a fourth diode having an anode coupled to said seventh node and an anode coupled to said third node;
- a fourth capacitor coupled between said third and sixth nodes; and
- a fifth capacitor coupled between said fourth and seventh nodes.

8. The converter of claim 1, wherein said current sensing device comprises a sense resistor coupled between said reference node and said first node and an amplifier having an input coupled to said sense resistor and an output providing said sense signal.

9. An electronic device, comprising:
- a Z-type converter, comprising:
  - a rectifier network for rectifying an AC voltage to provide a rectified voltage on a first node;
  - a first capacitor coupled between said first node and a second node;
  - a first inductor coupled between said first node and a third node;
  - a second capacitor coupled between said third node and a fourth node having a reference voltage level;
  - a second inductor coupled between said second node and a fifth node;
  - a first diode having an anode coupled to said second node and a cathode coupled to said third node; and
  - an electronic switch having a first current terminal coupled to said first node, having a second current terminal coupled to said fourth node, and having a control terminal;
- a current sensor for sensing current from said fourth node to said fifth node and through said second inductor and providing a proportional sense signal;
- a DC load coupled between said fourth and fifth nodes, wherein said DC load includes a filter capacitor coupled between said fourth and fifth nodes; and
- a controller coupled to said third node, receiving said sense signal, and coupled to said control terminal of said electronic switch, wherein said controller controls said electronic switch to maintain relatively constant current through said second inductor.

10. The electronic device of claim 9, wherein said DC load comprises at least one light emitting diode.

11. The electronic device of claim 9, wherein said DC load comprises at least one rechargeable battery.

12. The electronic device of claim 9, further comprising:
- a line dimmer circuit which receives an AC line voltage and which provides said AC voltage as an AC conductive angle modulated voltage based on a dimming phase angle; and
- wherein said converter, current sensor and controller collectively regulate said current through said second inductor based on said dimming phase angle.

13. The electronic device of claim 9, wherein said controller comprises a hysteretic current mode controller which turns on said electronic switch when said sense signal indicates a valley current level, wherein said hysteretic current mode controller turns off said electronic switch when said sense signal indicates a peak current level which is greater than said valley current level, and wherein said filter capacitor is configured to filter switching frequency ripple so that current through the load is an the average of said valley current level and said peak current level.

14. The electronic device of claim 13, wherein said hysteretic current mode controller keeps said electronic switch turned off while a voltage level of said third node is below a predetermined minimum voltage level.

15. The electronic device of claim 9, further comprising a valley fill network coupled between said first and second nodes to keep said third node above a predetermined minimum level.

16. The electronic device of claim 9, wherein said controller comprises:
- a first comparator which compares said sense signal with a valley value indicative of a valley current level and which provides a set signal indicative thereof;
- a second comparator which compares said sense signal with a peak value indicative of said peak current level and which provides a reset signal indicative thereof;
- a third comparator which compares voltage level of said third node with a predetermined minimum level and which provides an enable signal; and
- a logic network coupled to said control terminal of said electronic switch and receiving said set, reset and enable signals, wherein said logic network turns on said electronic switch in response to said set signal and turns off said electronic switch in response to said reset signal while said enable signal indicates that said third node is at least a predetermined minimum level, and which keeps said electronic switch turned off when said enable signal indicates that said third node is below said predetermined minimum level.

17. A method of converting an AC input voltage to a DC output with a regulated output current using a converter, wherein the converter comprises a first inductor coupled between first and second nodes, a first capacitor coupled between the second node and a reference node, a diode having an anode coupled to a third node and a cathode coupled to the second node, a load network including a filter capacitor coupled between the reference node and a fourth node, a second inductor coupled between the third and fourth nodes, and a switch having current terminals coupled between the first and reference nodes and having a control terminal, said method comprising:
- rectifying the AC input voltage to provide a rectified voltage between the first and third nodes;
- monitoring voltage of the second node;
- monitoring second inductor current flowing through the second inductor and providing a sense signal indicative thereof; and
- controlling the switch by turning on the switch when the sense signal indicates that the second inductor current falls to a valley current level while the voltage of the second node is at least a predetermined minimum level, and turning off the switch when the voltage of the second node is less than the predetermined minimum level and when the sense signal indicates that the second inductor current rises to a peak current level while the voltage of the second node is at least the predetermined minimum level.

18. The method of claim 17, further comprising reducing high frequency components of the rectified voltage.

19. The method of claim 17, further comprising filling voltage valleys of the rectified voltage to keep voltage of the second node above the predetermined minimum level during normal operation.

20. The method of claim 17, further comprising filtering the AC input voltage to reduce electromagnetic interference.

* * * * *